(12) United States Patent
Burns et al.

(10) Patent No.: US 6,659,124 B2
(45) Date of Patent: Dec. 9, 2003

(54) SIDE SPRAY MOUNTING WITH COLLAPSIBLE INSERT

(75) Inventors: Leonard J. Burns, Amherst, OH (US); Martin Zummersch, Olmsted Falls, OH (US)

(73) Assignee: Moen Incorporated, North Olmsted, OH (US)

( * ) Notice: Subject to any disclaimer, the term of this patent is extended or adjusted under 35 U.S.C. 154(b) by 215 days.

(21) Appl. No.: 10/006,627

(22) Filed: Nov. 8, 2001

(65) Prior Publication Data

US 2003/0084937 A1 May 8, 2003

(51) Int. Cl.⁷ .................................................. E03C 1/04
(52) U.S. Cl. ........................... 137/359; 137/801; 4/675; 4/678
(58) Field of Search ................................ 137/359, 801; 4/675, 678; 239/525, 526

(56) References Cited

U.S. PATENT DOCUMENTS

| | | |
|---|---|---|
| 2,200,503 A | 5/1940 | Judell et al. |
| 4,976,287 A | 12/1990 | Sheen |
| 5,073,991 A | 12/1991 | Marty |
| 5,090,062 A | 2/1992 | Hochstrasser |
| 5,095,554 A | 3/1992 | Gloor |
| 5,127,438 A | 7/1992 | Williams |
| 5,158,234 A | 10/1992 | Magnenat et al. |
| 5,349,987 A | 9/1994 | Shieh |
| 5,361,431 A | 11/1994 | Freier et al. |
| 5,381,830 A | 1/1995 | Niemann et al. |
| 5,458,154 A | 10/1995 | Niemann et al. |
| 5,464,045 A | 11/1995 | Niemann et al. |
| 5,758,690 A | 6/1998 | Humpert et al. |
| 5,822,811 A * | 10/1998 | Ko ............................... 4/678 |
| 5,845,345 A * | 12/1998 | Ko ............................... 4/678 |
| 5,884,662 A * | 3/1999 | Ko ............................... 137/801 |
| 5,934,325 A | 8/1999 | Brattoli et al. |
| 6,123,106 A | 9/2000 | Benstead |
| 6,220,278 B1 | 4/2001 | Sauter et al. |

* cited by examiner

Primary Examiner—A. Michael Chambers
(74) Attorney, Agent, or Firm—Cook, Alex, McFarron, Manzo, Cummings & Mehler, Ltd.

(57) ABSTRACT

A side spray mounting assembly includes a side spray with an attached water hose extending downwardly through a hose guide. A mounting nut attaches the hose guide to a sink deck. There is an escutcheon which is attached to the hose guide above the sink deck with the side spray being supported by the escutcheon. A collapsible insert is inserted within the escutcheon and the hose guide to prevent wobble of the side spray when it is positioned within the escutcheon.

9 Claims, 1 Drawing Sheet

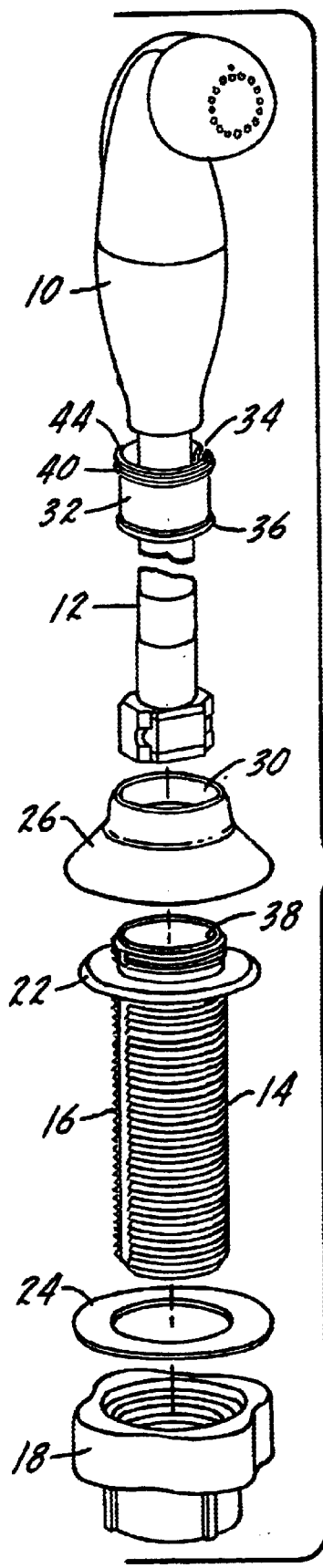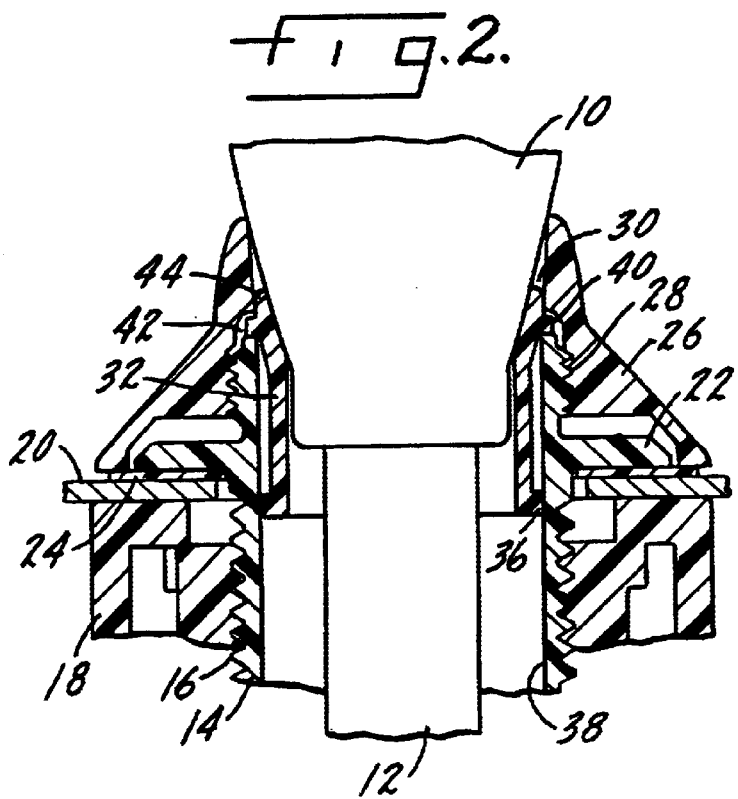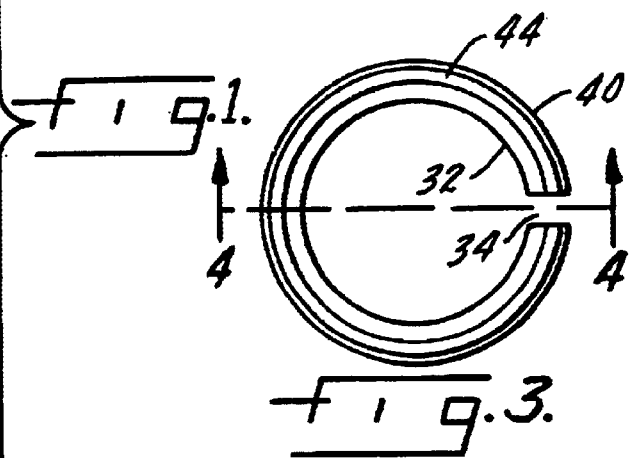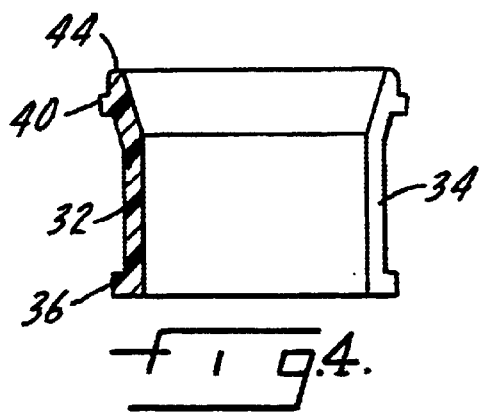

SIDE SPRAY MOUNTING WITH COLLAPSIBLE INSERT

THE FIELD OF THE INVENTION

The present invention relates to kitchen deck side sprays and, more specifically, to a mounting assembly for such a side spray which prevents wobble when the side spray is at rest and not being used. More particularly, a split ring is inserted into the escutcheon which normally supports the side spray. Once so positioned, the split ring or collapsible insert reduces the size of the gap between the side spray and escutcheon to ensure the correct upright position of the side spray on the sink deck.

SUMMARY OF THE INVENTION

The present invention relates to kitchen deck side sprays and, more specifically, to the use of a collapsible insert to ensure the correct upright position of the side spray when mounted on the sink deck.

A primary purpose of the invention is a side spray mounting assembly utilizing a split ring, positioned within the escutcheon, to prevent wobble of the side spray when it is at rest and unused on the sink deck.

Another purpose of the invent is to provide an insert as described, which is installed during the mounting of the side spray, and ensures the correct position of the side spray on the sink deck.

Other purposes will appear in the ensuing specification, drawings and claims.

BRIEF DESCRIPTION OF THE DRAWINGS

The invention is illustrated diagrammatically in the following drawings wherein:

FIG. 1 is an exploded perspective of the side spray mounting assembly of the present invention;

FIG. 2 is an enlarged partial section illustrating the components of the mounting assembly;

FIG. 3 is a top view of the split ring; and

FIG. 4 is a section along plane 4—4 of FIG. 3.

DESCRIPTION OF THE PREFERRED EMBODIMENT

In the exploded perspective of FIG. 1, the side spray is indicated at 10 and may be of the type sold by Moen Incorporated of North Olmsted, Ohio, and, more specifically, shown in co-pending application Ser. No. 09/893,864, the subject matter of which is herein incorporated by reference. The specific construction of the side spray is not important to an understanding of the present invention. Extending downwardly from the side spray 10 is a hose 12, which will extend through a hose guide 14 and be connected to a conventional source of water.

The hose guide 14 has an exterior threaded surface 16 to receive a mounting nut 18. When the hose guide is positioned on the sink deck 20, and the guide maybe inserted from above the sink deck 20, the outwardly flange 22 of the hose guide will rest on top of a gasket 24, which in turn is seated on the sink deck. The nut 18 will be turned on the threaded area 16 of the hose guide and will fit snugly against the bottom of the sink deck 20 to thereby secure the hose guide in position relative to the deck. An escutcheon 26 will be positioned on top of the hose guide and will be threadedly attached thereto, as at 28. The escutcheon 26 will overlie the flange 22 and the gasket 24 and has a coaxial opening 30 to mount the side spray 10, as particularly shown in FIG. 2.

A collar insert or split ring is indicated at 32 and may be in the form of a flexible ring with an axially extending opening, as at 34, so that the ring will collapse when it is inserted into the escutcheon 26. As particularly shown in FIG. 2, the split ring 32 has an lower outwardly extending rim 36 which, when the ring is inserted, will bear against the interior wall 38 of the hose guide 14. Thus, the lower end of the split ring is firmly supported by the hose guide. The split ring has an upper rim 40, which extends into a space 42, defined between the upper end of the hose guide and a recess in the escutcheon. The combination of the recess and the rim 40 firmly positions the upper end of the split ring for support of the side spray 10. The upper portion of the insert 32 has a conical wall 44, which is particularly shown in FIGS. 2 and 4, and will support the outer conical surface of the side spray 10.

In assembly, after the hose guide and escutcheon are installed and the side spray hose is inserted through the escutcheon, the split ring will be inserted into the escutcheon and pushed into place with the body of the side spray. This creates a snap fit connection with the inside of the escutcheon and with the hose guide. The primary function of the split ring is to reduce the size of the gap between the side spray and the escutcheon to thereby ensure a correct upright position of the side spray when at rest.

Whereas, the preferred form of the invention has been shown and described herein, it should be realized that there maybe many modifications, substitutions and alterations thereto.

The embodiments of the invention in which an exclusive property or privilege is claimed are as follows:

1. A side spray mounting assembly including a side spray, a water hose attached to said side spray, a hose guide, said hose extending into said hose guide, a mounting member movable on said hose guide for use in attaching the side spray mounting assembly to a sink deck, said hose guide being supported from above the sink deck, an escutcheon attached to the hose guide above the sink deck and having an opening coaxial with the hose guide, said escutcheon having an upwardly extending portion supporting said side spray, and a collapsible insert positioned inside of said escutcheon opening and inside of said hose guide to further support said side spray and to prevent wobble thereof within said escutcheon.

2. The side spray mounting assembly of claim 1 wherein said hose guide includes an outwardly extending flange, which flange is supported on the sink deck.

3. The side spray mounting assembly of claim 2 wherein said escutcheon is attached to said hose guide above said flange and overlies said flange.

4. The side spray mounting assembly of claim 1 wherein said collapsible insert is a flexible split ring.

5. The side spray mounting assembly of claim 1 wherein said collapsible insert includes an outwardly extending rim which rests on an upper end of said hose guide and is held therein by a portion of said escutcheon.

6. The side spray mounting assembly of claim 5 wherein said collapsible insert includes a second outwardly extending rim, which bears against the inside of said hose guide.

7. The side spray mount assembly of claim 6 wherein said collapsible insert includes a cylindrical portion and a generally conical portion, with the conical portion supporting the side spray.

8. The side spray mounting assembly of claim 1 wherein the mounting member includes a threaded nut.

9. The side spray mounting assembly of claim 1 wherein the escutcheon is threadedly attached to an upper portion of said hose guide.

* * * * *